(12) United States Patent
Hainsworth

(10) Patent No.: US 9,284,029 B2
(45) Date of Patent: Mar. 15, 2016

(54) HELICOPTER EXTERNAL LIFE RAFT POD

(71) Applicant: Sikorsky Aircraft Corporation, Stratford, CT (US)

(72) Inventor: Barton J. Hainsworth, Oxford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 169 days.

(21) Appl. No.: 13/847,191

(22) Filed: Mar. 19, 2013

(65) Prior Publication Data

US 2014/0284420 A1 Sep. 25, 2014

(51) Int. Cl.
*B63C 9/01* (2006.01)
*B64D 25/16* (2006.01)

(52) U.S. Cl.
CPC .. *B63C 9/01* (2013.01); *B64D 25/16* (2013.01)

(58) Field of Classification Search
CPC ............ B63C 9/01; B63C 9/06; B63C 9/065; B64D 25/16; B64D 25/00; B64D 1/02; B64D 1/00
USPC .............................. 244/137.4; 441/80, 83, 87
See application file for complete search history.

(56) References Cited

U.S. PATENT DOCUMENTS

| | | | |
|---|---|---|---|
| 2,095,974 A | | 8/1936 | Finch |
| 2,444,859 A | * | 7/1948 | Sturtevant ........................ 441/40 |
| 2,510,843 A | * | 6/1950 | Townshend ................. 114/77 R |
| 3,036,315 A | | 5/1962 | Karnow |
| 3,910,532 A | * | 10/1975 | Fischer ...................... 244/137.2 |
| 4,063,323 A | * | 12/1977 | Salvarezza ................ B63C 9/20 114/190 |
| 4,280,239 A | * | 7/1981 | Brown ...................... B63C 9/04 441/42 |
| 4,355,987 A | * | 10/1982 | Miller .............................. 441/41 |
| 4,441,582 A | * | 4/1984 | Ward, Jr. ......................... 182/48 |
| 4,631,038 A | * | 12/1986 | Ritter et al. ..................... 441/80 |
| 4,639,229 A | | 1/1987 | Wright et al. |
| 4,690,650 A | | 9/1987 | Bell |
| 4,861,298 A | * | 8/1989 | Whitman et al. ............... 441/42 |
| 5,360,186 A | * | 11/1994 | Danielson et al. ......... 244/137.2 |

(Continued)

FOREIGN PATENT DOCUMENTS

IN 356DEL1998 5/2008

OTHER PUBLICATIONS

The Encyclopedia of Science, "buoyancy" page, http://www.daviddarling.info/encyclopedia/B/buoyancy.html, archived by Internet Archive on May 10, 2012, https://web.archive.org/web/20120510121207/http://www.daviddarling.info/encyclopedia/B/buoyancy.html, accessed Aug. 14, 2015.*

(Continued)

*Primary Examiner* — Tien Dinh
*Assistant Examiner* — Alexander V Giczy
(74) *Attorney, Agent, or Firm* — Cantor Colburn LLP

(57) ABSTRACT

An emergency pod configured for use with a rotary wing aircraft is provided including a rigid, generally hollow shell. An inflatable raft is arranged within an interior portion of the hollow shell. The life raft is coupled to an inflation mechanism. A first activation device and a second activation device are operably coupled to the inflation mechanism, the second activation device being disposed within the shell and fastened to a movable portion of the shell, wherein the first activation device and the second activation device operable independently of one another. Inflation of the inflatable raft is initiated when a force is applied to one of the first activation device and the second activation device.

12 Claims, 6 Drawing Sheets

(56) References Cited

U.S. PATENT DOCUMENTS

| | | | |
|---|---|---|---|
| 5,468,167 A * | 11/1995 | Givens | 441/40 |
| 5,597,335 A | 1/1997 | Woodland | |
| 6,709,305 B2 * | 3/2004 | Parrott et al. | 441/40 |
| 7,309,267 B1 | 12/2007 | Henry et al. | |
| 7,314,398 B2 | 1/2008 | Parrott et al. | |
| 7,708,611 B2 | 5/2010 | Simon-Bouhet | |
| 7,819,714 B2 | 10/2010 | Medford et al. | |
| 2010/0065691 A1 * | 3/2010 | Droney | 244/53 R |
| 2010/0230534 A1 * | 9/2010 | Bravo et al. | 244/107 |

OTHER PUBLICATIONS

Wikipedia, AH-64 Apache page. Archieved on by Internet Archive on Jun. 3, 2010, https://web.archive.org/web/20100603225053/http://en.wikipedia.org/wiki/Boeing_AH-64_Apache, accessed Aug. 14, 2015.*

International Search Report for application PCT/US14/31012, dated Nov. 7, 2014, 8 pages.

Written Opinion for application PCT/US14/31012, dated Nov. 7, 2014, 6 pages.

* cited by examiner

HELICOPTER EXTERNAL LIFE RAFT POD

BACKGROUND OF THE INVENTION

Exemplary embodiments of the invention relate to a rotary wing aircraft and, more particularly, to a deployable emergency life raft for use by a search and rescue rotary wing aircraft.

Several thousand people drown worldwide each year. In many instances, these deaths are the result of exhaustion, dehydration, and hypothermia induced loss of coordination and consciousness. In instances when survival is not affected by lower temperatures, the task of locating, assisting and otherwise recovering persons in peril from an aquatic environment may be compounded by inclement weather or environmental obstacles, such as fire, ice, or smoke for example, which make approach to the victim perilous to the life of the rescuer.

Overwater search and rescue operations generally require a rotary wing aircraft to cover long distances and grid patterns in search of in-water survivors who may need immediate assistance prior to rescue from a helicopter rescue hoist or a nearby vessel. The need may arise to drop one or more emergency life rafts to survivors at multiple locations. When conventional life rafts are deployed, the life rafts may be rapidly swept away from its deployed location, such that the life rafts provide little or no benefit to physically exhausted survivors who are unable to reach the raft in time.

BRIEF DESCRIPTION OF THE INVENTION

According to one embodiment of the invention, an emergency pod configured for use with a rotary wing aircraft is provided including a rigid, generally hollow shell. The shell includes a movable portion configured to move between a closed position and an open position. An inflatable raft is arranged within an interior portion of the hollow shell. The life raft is coupled to an inflation mechanism. A first activation device and a second activation device are operably coupled to the inflation mechanism. The first activation device and the second activation device are configured to operate the inflation mechanism to initiate inflation of the life raft when a force is applied thereto.

According to another embodiment of the invention, a rotary wing aircraft is provided including a main rotor system configured to rotate about an axis of rotation and an airframe. An emergency pod is releasably mounted to an external portion of the airframe. The emergency pod includes a rigid, generally hollow shell. The shell has a movable portion configured to move between a closed position and an open position. An inflatable raft is arranged within an interior portion of the hollow shell. The life raft is coupled to an inflation mechanism. A first activation device and a second activation device are operably coupled to the inflation mechanism. The first activation device and the second activation device are configured to operate the inflation mechanism to initiate inflation of the life raft when a force is applied thereto.

According to yet another embodiment of the invention, a method of releasing an emergency pod coupled to a rotary wing aircraft is provided including maneuvering the rotary wing aircraft to a predetermined height and/or speed relative to a body of water. The emergency pod is jettisoned from the rotary wing aircraft. A tension is created on a first activation device of the emergency pod. Inflation of a life raft within the emergency pod is initiated and the emergency pod is separated from the rotary wing aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
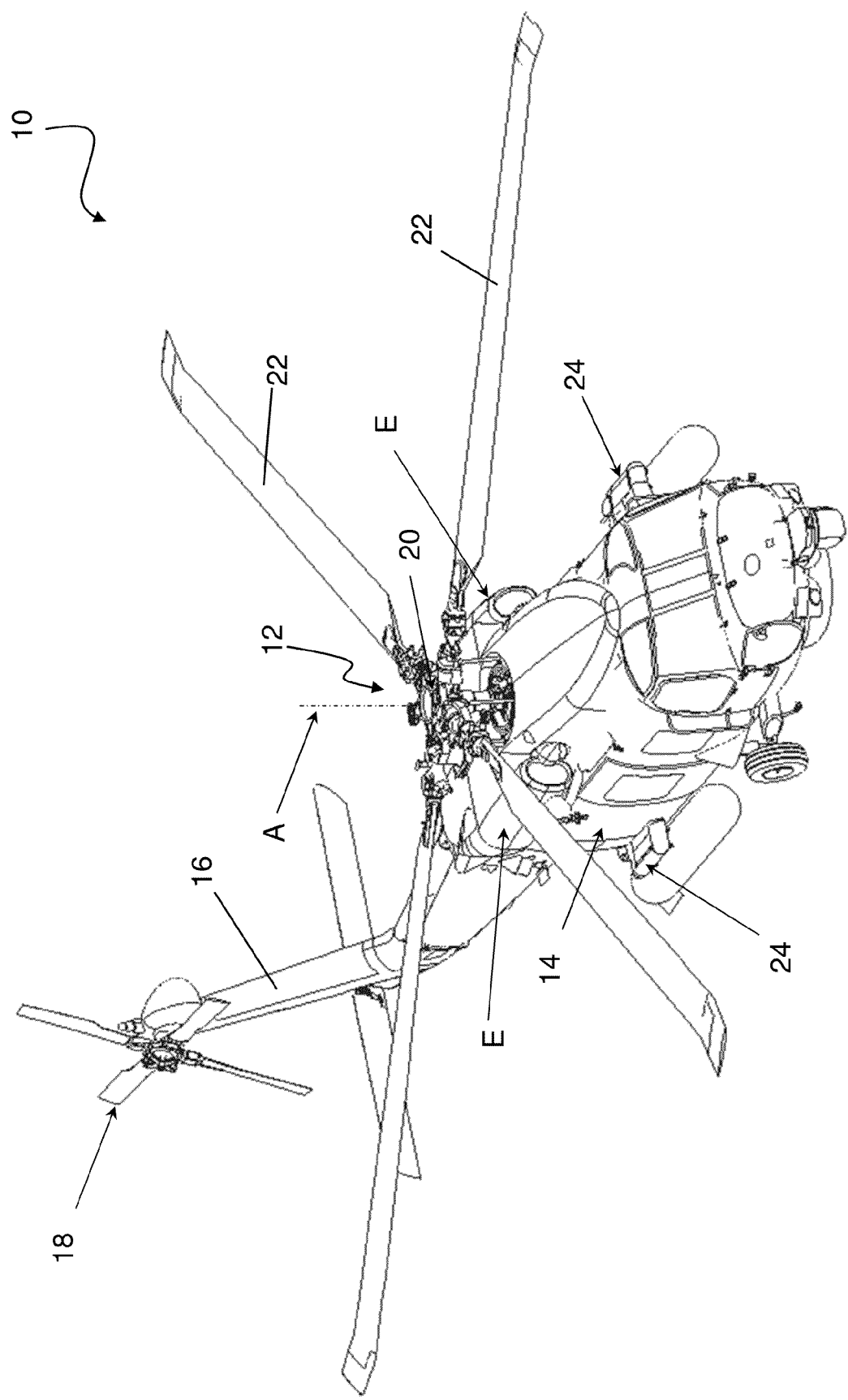
FIG. 1 is a perspective view of an exemplary search and rescue rotary wing aircraft.

FIG. 1 schematically illustrates an exemplary search and rescue rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (not shown) by one or more engines E. The main rotor system 12 includes a rotor hub 20 having a plurality of rotor blade assemblies 22 mounted to and projecting radially outwardly therefrom. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2:
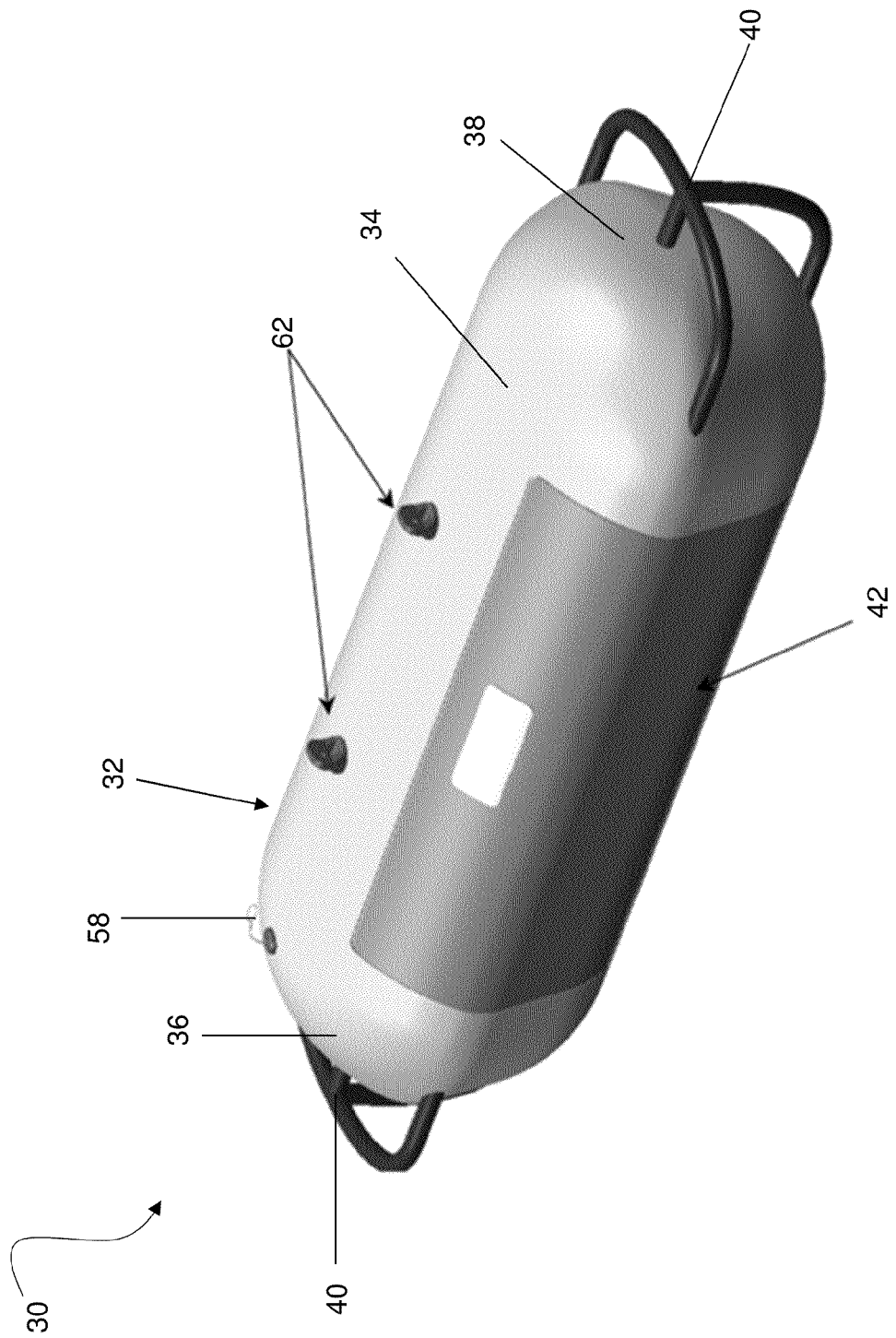
FIG. 2 is a perspective view an emergency pod configured for use with a search and rescue rotary wing aircraft according to an embodiment of the invention.
Figure 3:
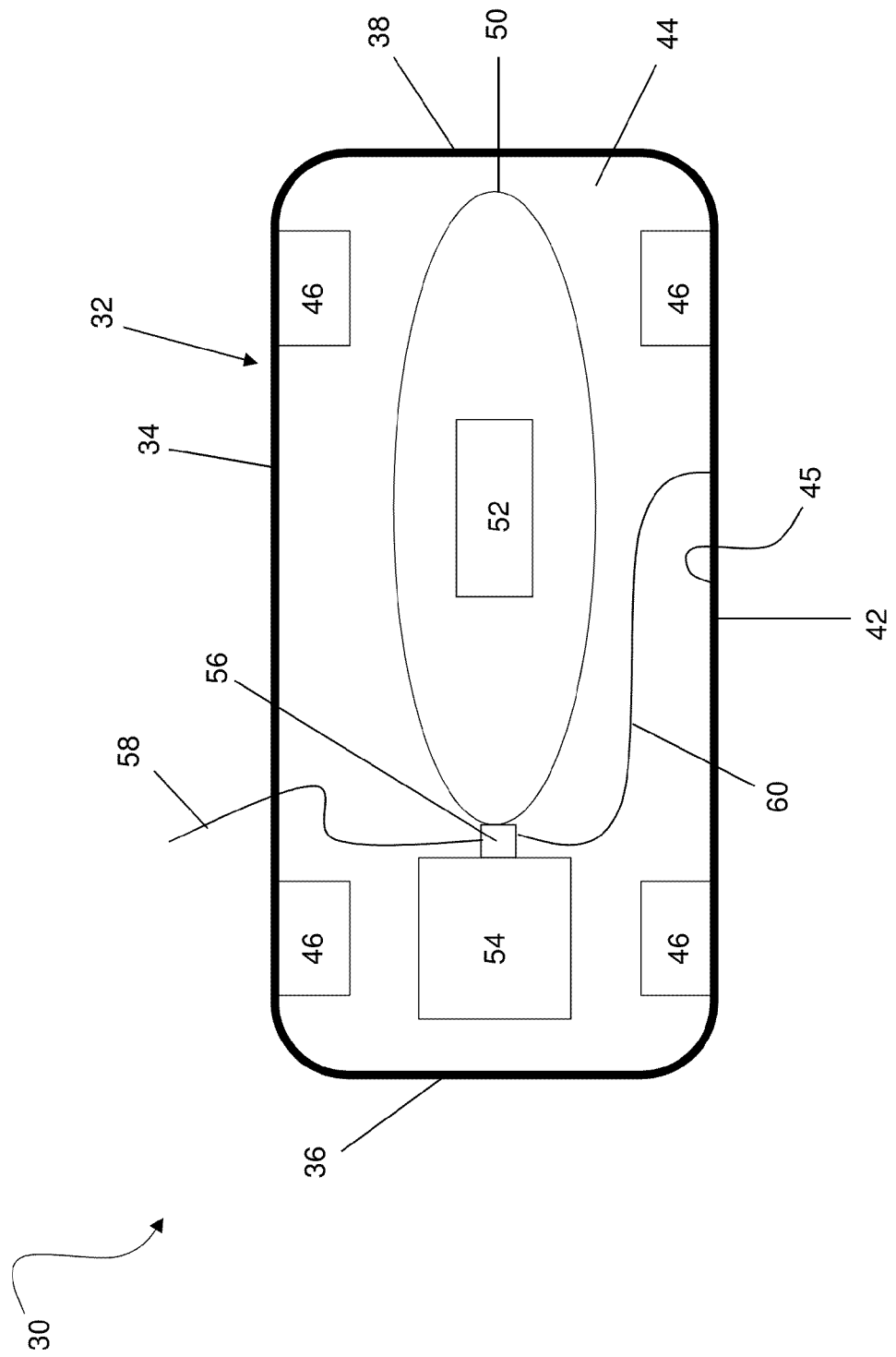
FIG. 3 is a top view of a cross section of the emergency pod according to an embodiment of the invention.

An emergency pod 30, configured for use with a rotary wing aircraft 10, is illustrated in more detail in FIG. 2. The emergency pod 30 includes a rigid, generally hollow shell 32, formed from a rigid material, such as formed aluminum or a composite material for example. In one embodiment, the shell 32 has an aerodynamic shape configured to reduce drag while the rotary wing aircraft 10 is in flight. At least one handle 40 is mounted to the exterior surface 34 of the shell 32. In one non-limiting embodiment, as illustrated in the FIG., two handles 40 are arranged adjacent the longitudinal ends 36, 38 of the shell 32. The handles 40 may facilitate carrying the pod 30 and installing the pod 30 on the rotary wing aircraft 10, as well as provide an area for a person waiting to be rescued to grab onto. The shell 32, additionally includes a portion 42, such as a panel for example, configured to move between a first, closed position and a second, open position to reveal the interior 44 of the hollow shell 32 (see FIG. 3). When the movable portion 42 is in the closed position, the shell 32 is hermetically sealed such that the shell 32 is substantially buoyant when dropped into a body of water and the interior 44 of the shell 32 is protected from salt fog intrusion. In one embodiment, a plurality of floats 46 are positioned within the interior 44 of the shell 32 such that the pod 30 is configured to float, even when the movable portion 42 is in the open position.

Arranged within the interior 44 of the emergency pod 30 is a standard inflatable emergency life raft 50 equipped with a survival kit 52 in accordance with the Federal Aviation Administration's regulation set forth in TSO-C70a. An inflation mechanism 54 within the shell 32, such as a pressurized gas for example, is operably coupled to the life raft 50 and is configured to inflate the life raft 50 when activated. The inflation mechanism 54 is connected to a first activation device 58 extending from the exterior surface 34 of the shell 32. The inflation mechanism 54 may also be connected to a second activation device 60 arranged substantially within the pod 30. The first and second activation devices 58, 60 may be a rope or lanyard. In one embodiment, the second activation device 60 is operably coupled to the movable portion 42 of the shell 32. Application of a force to either the first or second activation device 58, 60 is configured to activate the inflation mechanism 54 by opening a valve 56 thereof, such that a gas within the inflation mechanism 54 begins to inflate the life raft 50. As the life raft 50 begins to inflate, the life raft 50 will exert a pressure on an interior surface 45 of the movable portion 42 causing the movable portion 42 to pivot from the closed position to the open position, and the raft 50 to exit from the interior 44 of the shell 32.

Figure 4:
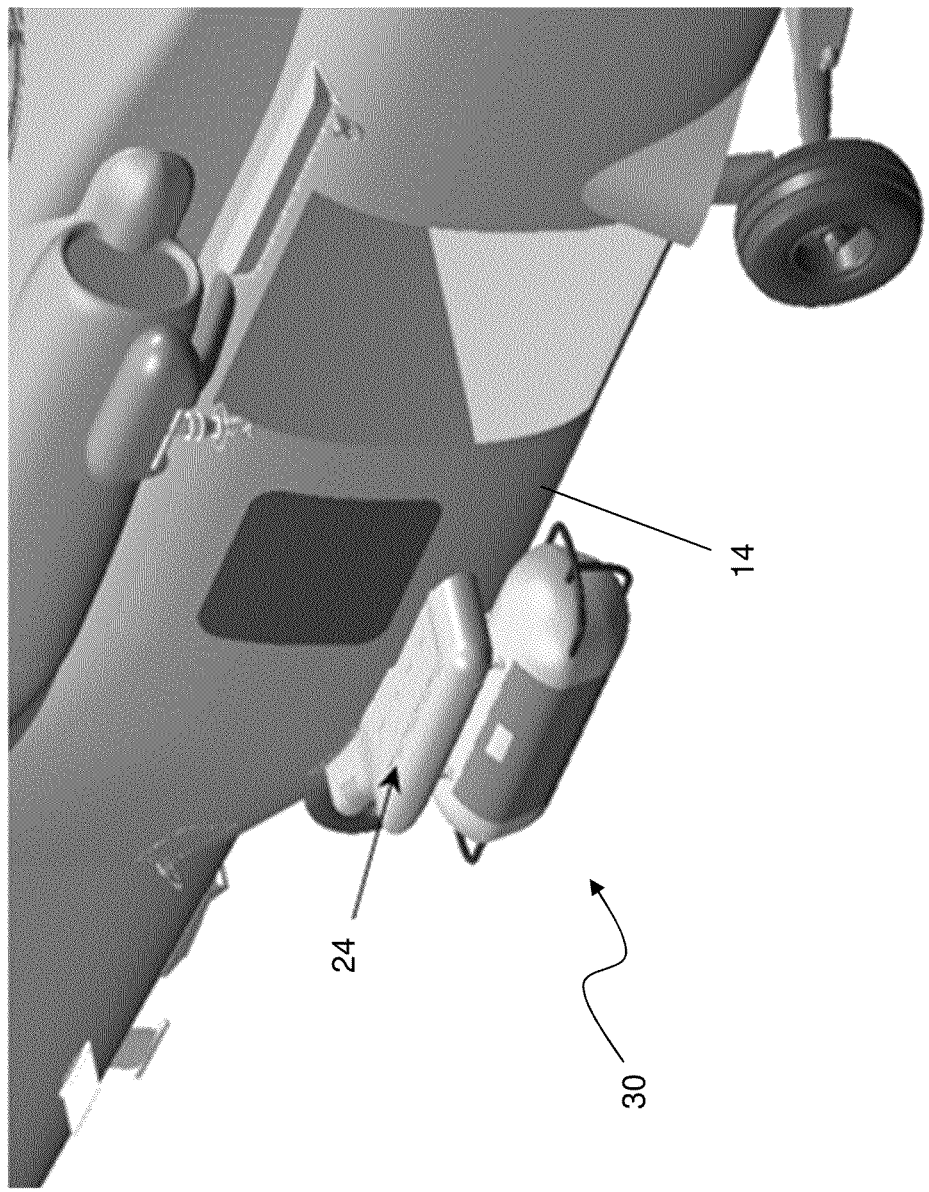
FIG. 4 is a perspective view of the interface between the emergency pod and the rotary wing aircraft according to an embodiment of the invention.
Figure 5:
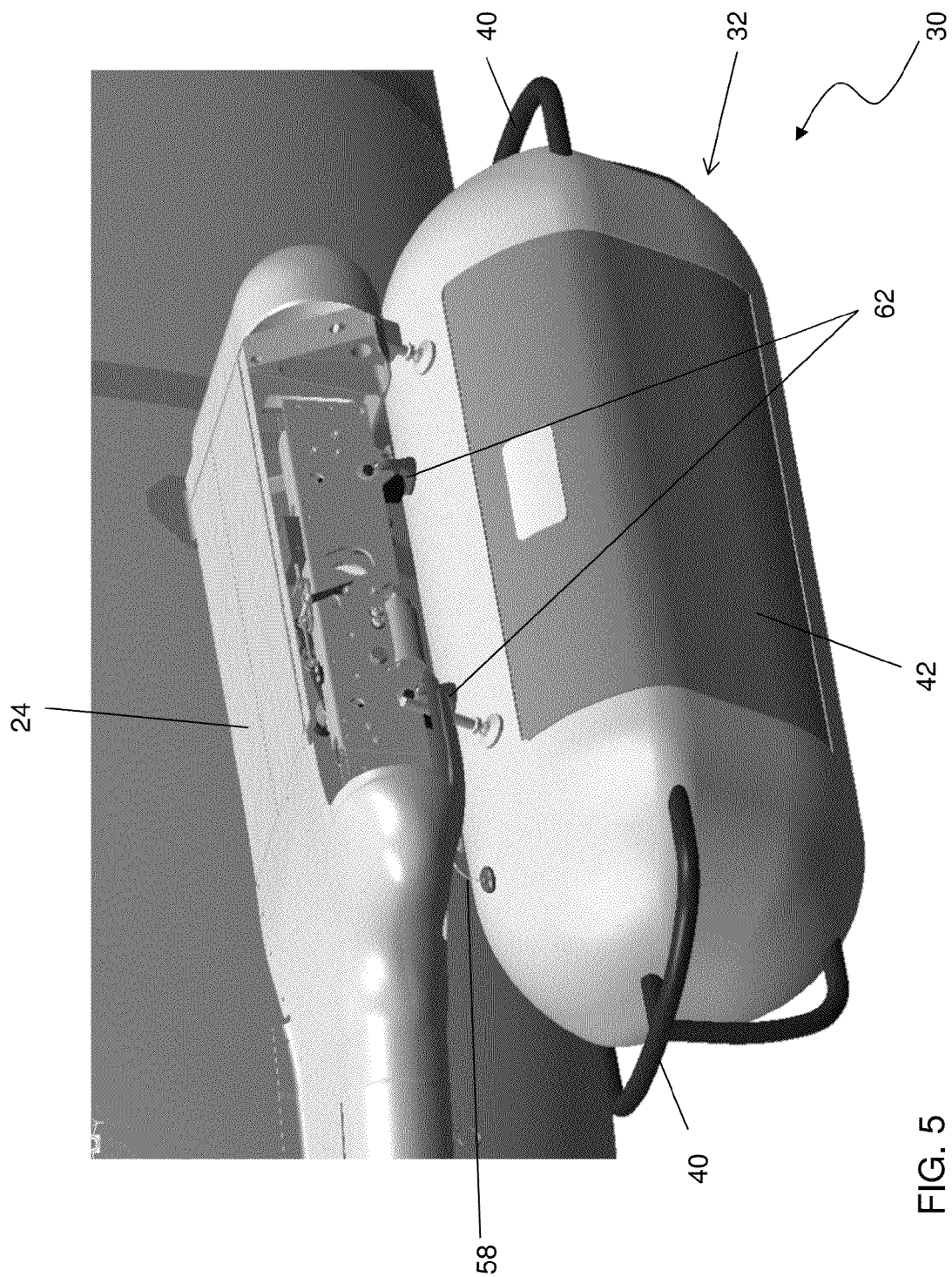
FIG. 5 is a detailed perspective view of the interface between the emergency pod and the rotary wing aircraft according to an embodiment of the invention.
Figure 6:
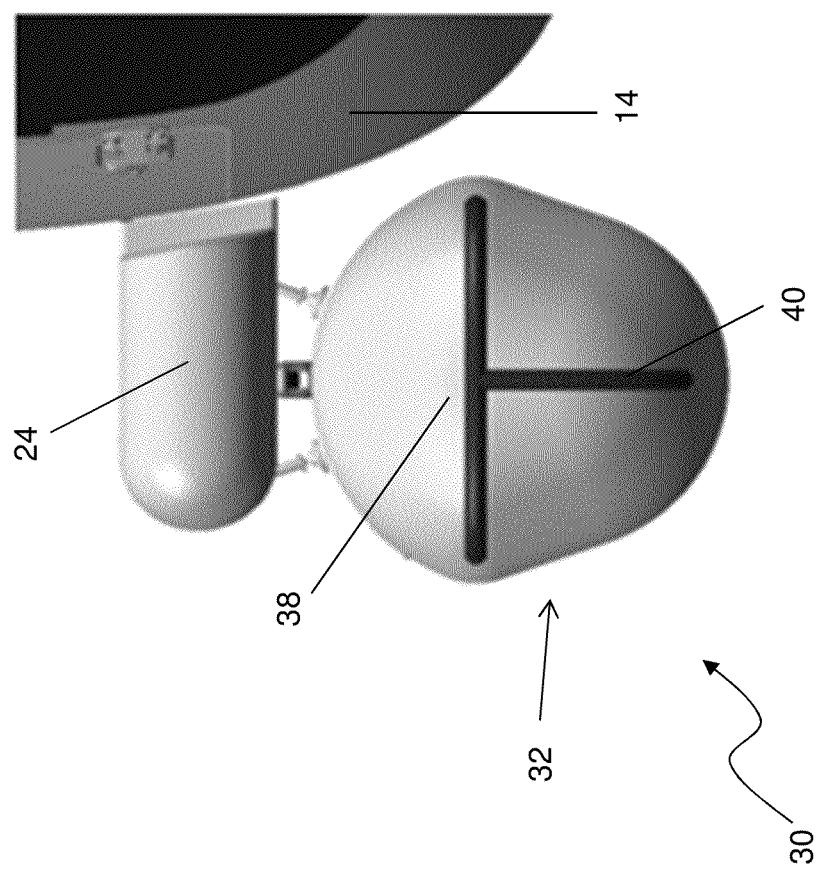
FIG. 6 is a front view of the emergency pod and the rotary wing aircraft according to an embodiment of the invention.

A search and rescue rotary wing aircraft 10 may include any number of emergency pods 30. Each emergency pod 30 is configured to mount to an external portion of the rotary wing aircraft 10, such as an external stores pylon 24 extending generally horizontally from the airframe 14 near a primary egress for example (see FIGS. 4-6). The emergency pod 30 is releasably mounted to a bomb rack (not shown) of the external stores pylon 24 in a conventional manner, such as using suspension lugs 62 spaced apart by a distance of approximately fourteen inches for example (see FIGS. 2 and 5). In addition, a portion of the first activation device 58 is coupled to the pylon 24 or an adjacent portion of the airframe 14.

The emergency pod 30 is configured to be released from the pylon 24 when the rotary wing aircraft 10 is either hovering close to the water, or alternatively, when the rotary wing aircraft 10 is moving at a slow speed at a distance of less than or equal to approximately forty feet above the water. To deploy the emergency pod 30, an operator, through a flight control system (not shown) jettisons the emergency pod 30 in a manner similar to launching a bomb. As a result of gravity, deployment of the pod 30 applies a tension to the first activation device 58, thereby causing the inflation mechanism 54 to initiate inflation of the raft 50. As the force of the first activation device 58 increases, the first activation device 58 separates from the aircraft 10, and the pod 30 drops to the body of water below the rotary wing aircraft 10. The pressure of the inflating life raft 50 causes the movable portion 42 of the shell 32 to pivot open, and the raft 50 to expand outwardly. In one embodiment, first activation device 58 is a lanyard and the length of the lanyard is selected to allow the emergency pod 30 to at least partially drop below the rotary wing aircraft 10 before inflation of the raft 50 is initiated.

The emergency pod 30 may also be used by the crew on the rotary wing aircraft 10, such as during an emergency over-water landing for example. The pod 30 will be jettisoned when water ditching is imminent. If the pod 30 is deployed when the aircraft 10 is at a height above the water such that an adequate tension is applied to the first activation device 58, inflation of the raft 50 will initiate. In one embodiment, the length of time required to inflate the raft 50 is sufficient for rotation of the rotor 12 to stop and the crew on the aircraft 10 to egress. Alternatively, inflation of the raft 50 may be manually activated by a crewman in instances when the pod 30 is deployed too near the water for the first activation device 58 to initiate inflation. Pivoting the movable portion 42 of the shell to the open position applies a force to the second activation device 60, thereby initiating inflation of the raft 50.

The emergency pod 30 described herein may be easily jettisoned to nearby survivors or may provide a personal survival function to the crew of the rotary wing aircraft 10. Due to the buoy-like structure and weight of the pod 30, movement of the pod 30 will be less than that of an inflated life raft which may be quickly swept away from its initial drop point by wind and waves.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An emergency pod configured for use with a rotary wing aircraft, comprising:
    a rigid, generally hollow shell including a movable portion configured to move between a closed position and an open position, wherein the shell is configured as a floatation device when the movable portion is in the closed position and the open position;
    an inflatable life raft arranged within an interior portion of the hollow shell, the life raft being coupled to an inflation mechanism; and
    a first activation device and a second activation device operably coupled to the inflation mechanism, the second activation device being disposed within the shell and fastened to the movable portion of the shell, wherein the first activation device and the second activation device are operable independently of one another and are configured to operate the inflation mechanism to initiate inflation of the life raft when a force is applied to either the first activation device or the second activation device.

2. The emergency pod according to claim 1, wherein the shell has a substantially aerodynamic shape configured to minimize drag.

3. The emergency pod according to claim 1, wherein a portion of the first activation device is arranged adjacent an exterior surface of the shell.

4. The emergency pod according to claim 1, wherein when the movable portion is in the closed position, the shell is generally sealed such that the emergency pod is substantially buoyant.

5. The emergency pod according to claim 1, further comprising at least one handle mounted to an exterior surface of the shell.

6. The emergency pod according to claim 1, further comprising a survival kit arranged within the interior portion of the shell.

7. The emergency pod according to claim 1, further comprising at least one float arranged within the interior portion of the shell such that the emergency pod is substantially buoyant when the movable portion is in the open position.

8. A rotary wing aircraft comprising:
  a main rotor system configured to rotate about an axis of rotation;
  an airframe;
  an emergency pod releasably mounted to an external portion of the airframe, the emergency pod including:
    a rigid, generally hollow shell including a movable portion configured to move between a closed position and an open position, wherein the shell is configured as a floatation device when the movable portion is in the closed position and the open position;
    an inflatable life raft arranged within an interior portion of the hollow shell, the life raft being coupled to an inflation mechanism;
    a first activation device and a second activation device operably coupled to the inflation mechanism, the second activation device being disposed within the shell and fastened to the movable portion of the shell, wherein the first activation device and the second activation device are operable independently of one another and are configured to operate the inflation mechanism to initiate inflation of the life raft when a force is applied to either the first activation device or the second activation device.

9. The rotary wing aircraft according to claim 8, wherein the first activation device is coupled to the airframe.

10. The rotary wing aircraft according to claim 9, wherein the emergency pod is mounted to an external stores pylon extending generally horizontally from the airframe.

11. The rotary wing aircraft according to claim 9, wherein the emergency pod is mounted to the airframe near a primary egress.

12. The rotary wing aircraft according to claim 9, wherein the emergency pod is mounted to the airframe using standard suspension lugs.

* * * * *